(12) United States Patent
Hollander et al.

(10) Patent No.: US 6,412,071 B1
(45) Date of Patent: Jun. 25, 2002

(54) METHOD FOR SECURE FUNCTION EXECUTION BY CALLING ADDRESS VALIDATION

(76) Inventors: Yona Hollander, 37 Mishmar Hayarden Street, Tel Aviv; Ophir Rachman, 30 Smadar Street, Tel Aviv; Oded Horovitz, 43 Hagana Street, Hertzelia, all of (IL)

( * ) Notice: Subject to any disclaimer, the term of this patent is extended or adjusted under 35 U.S.C. 154(b) by 0 days.

(21) Appl. No.: 09/561,011

(22) Filed: Apr. 28, 2000

(30) Foreign Application Priority Data

Nov. 14, 1999 (IL) .................................................. 132915

(51) Int. Cl.[7] .............................................. G06F 11/30
(52) U.S. Cl. ..................................................... 713/200
(58) Field of Search ................................ 713/200, 201; 709/330, 331

(56) References Cited

U.S. PATENT DOCUMENTS

| | | | | |
|---|---|---|---|---|
| 5,287,504 A | * | 2/1994 | Carprnter et al. ............ | 707/201 |
| 5,317,746 A | | 5/1994 | Watanabe .................... | 395/700 |
| 5,369,770 A | | 11/1994 | Thomason et al. ......... | 395/725 |
| 5,557,742 A | | 9/1996 | Smaha et al. ................ | 395/186 |
| 5,574,915 A | | 11/1996 | Lemon et al. ............... | 395/700 |
| 5,584,023 A | | 12/1996 | Hsu ............................. | 395/620 |
| 5,621,889 A | | 4/1997 | Lermuzeaux et al. ........ | 395/186 |
| 5,640,562 A | | 6/1997 | Wold et al. .................. | 395/652 |
| 5,745,903 A | | 4/1998 | Huan .......................... | 707/201 |
| 5,758,168 A | | 5/1998 | Mealey et al. .............. | 395/733 |
| 5,764,889 A | | 6/1998 | Ault et al. ................... | 395/186 |
| 5,764,956 A | | 6/1998 | Akahori et al. ............. | 395/500 |
| 5,835,964 A | | 11/1998 | Draves et al. ............... | 711/207 |
| 5,867,710 A | | 2/1999 | Dorris et al. ................ | 395/704 |
| 5,875,290 A | | 2/1999 | Bartfai et al. .......... | 395/182.11 |
| 5,899,987 A | | 5/1999 | Yarom ............................ | 703/3 |
| 5,909,671 A | | 6/1999 | Byford et al. ................ | 705/26 |
| 5,925,126 A | | 7/1999 | Hsieh .......................... | 713/200 |
| 5,974,549 A | * | 10/1999 | Golan ......................... | 713/200 |
| 5,987,611 A | * | 11/1999 | Freund ....................... | 713/201 |

FOREIGN PATENT DOCUMENTS

EP 0447145 A2 9/1991 ........... G06F/13/28

* cited by examiner

Primary Examiner—Dennis M. Butler
(74) Attorney, Agent, or Firm—Gibson, Dunn & Crutcher LLP

(57) ABSTRACT

A method for detecting and preventing unauthorized or illegal attempts to gain enhanced privileges within a computing environment by exploiting the buffer overflow-related weakness of the computer system.

19 Claims, 7 Drawing Sheets

METHOD FOR SECURE FUNCTION EXECUTION BY CALLING ADDRESS VALIDATION

BACKGROUND OF THE INVENTION

The present invention relates generally to a method for detecting and preventing unauthorized or illegal access attempts within a computer system. More specifically, the present invention relates to a method for detecting and preventing attempts to exploit the buffer overflow-related weakness within a computer system.

Modern computers are designed according to the requirements of high-level programming languages. A fundamental technique for the structured design of computer programs, associated with the high-level languages, is the procedure or the function.

Procedures or functions are computer programs. A procedure call or a function call is a high-level programming concept that modifies the flow of the calling program execution. In contrast with the more traditional "jump" or "goto" instructions, which also alter the flow of execution, a procedure or a function, after the execution of its own code, returns control to the instruction immediately following the call. To implement procedure or function calls in the manner described a memory device called a stack is utilized.

A stack is a contiguous section of memory containing data, the size thereof is dynamically adjusted by the operating system routines at run time. The data is inserted to and removed from the stack by the Central Processing Unit (CPU) utilizing Assembler language instructions such as "push" or "pop."

The stack contains related information units such as logical stack frames or Procedure Activation Records that are inserted therein when a function is called and removed when the function returns control to the calling program.

The stack frame itself contains parameters to the called function, local variables, pointers to recover the previous stack frame, saved values of the CPU registers, and the return address of the calling computer program. The return address is the instruction pointer of the calling program at the time of the function call.

Induced buffer overflow or buffer overflow attack is known in the art. Buffer overflow attacks take advantage of the lack of bounds checking on the size of input being stored in a buffer array. Arrays are predefined allocated memory devices within a computer system. An attacker can make erratic changes to data stored adjacent to an allocated array by writing data intentionally past the end the array. The most typical data structure to be corrupted in this fashion is the stack. Therefore this type of attack is also known as stack smashing.

The prevalent form of buffer overflow exploitation is to attack buffers allocated on the stack. One objective of such an attack is inserting an attack code in the form of an executable object code native to the attacked machine. Another objective is to change the return address to point to the attack code now residing on the stack. Such attack code may be utilized to gain enhanced privileges over the computer system.

The programs that are attacked using this technique are usually high privilege utilities or daemons that run under the user-id root to perform essential services. The effect of a successful buffer overflow attack is to provide the attacker non-authorized root privileges. Gaining root privileges within a computer system allows non-authorized users access to privileged resources.

As the maximum length of the overflowing data string can be only the current depth of the stack, the inserted attack code should be short in terms of code length. Writing data outside the stack limit will result in an exception condition that will prevent the attack code to execute. Therefore, the buffer overflow attacker will be forced to write short code and will have to use high-level System calls or Library calls. Such calls will later be utilized to gain non-authorized enhanced privileges to access privileged resources.

Several strategies that attempt to resolve the buffer overflow weakness are known in the art. One such strategy is to design a compiler designed to prohibit a computer program from writing past a stack segment array. Another strategy is to detect buffer overflow vulnerable programs off line and alert the user to the possibility that the system privileges may be compromised.

Another known strategy is using a repair program. The repair program can repair or fix those vulnerable programs that can be used to exploit the buffer overflow weakness.

None of the above provide a method and apparatus for prevention of buffer overflow through controlled execution of system or other calls within a computer system.

SUMMARY OF THE INVENTION

One aspect of the present invention regards a computer system running an operating computer platform that includes a kernel space and a process space. The process space includes a user application operative to intercept system calls running in said process space and a method of secure function execution. The method of secure function execution comprises the steps of examining the intercepted system call validity by comparing the intercepted system call originating address with range of process valid addresses associated with the process from which the intercepted system call originated.

A second aspect of the present invention regards a computer system running an operating system platform, the operating system including a kernel space and a process space. The process space includes a user application running in process space, the user application is operative to intercept library calls. A method of secure function execution examines the intercepted library call validity by comparing the intercepted library call originating address with range of process valid addresses associated with the process from which the intercepted library call originated.

A third aspect of the present invention regards a computer system running an operating system platform. The operating system includes a kernel space and a process space. The process space includes a user application running in process space. The user application is operative to system and function calls, system or function calls intercepted, and a method of secure function execution. The method comprises the steps of receiving a caller routine return address from the process memory device and determining whether the caller routine address is valid by comparing the caller routine address with a process valid address table.

A fourth aspect of the present invention regards a computer system running an operating system platform. The operating system includes a kernel apace and a process space. The process space includes a user application running in process space. The user application is operative to system and function calls, system or function calls intercepted, and a method of secure function execution, The method comprises the steps of receiving a caller routine return address from said process memory device and determining whether the caller routine address is valid by comparing the caller routine address with an associated process stack address area.

Each of the above aspects of the present invention may provide the advantage of identifying unauthorized or illegal access attempts to software objects within a computer system.

Each of the above aspects of the present invention may provide the advantage of preventing unauthorized or illegal attempts to open, process or delete software objects within a computing environment.

Each of the above aspects of the present invention may provide the advantage of preventing attempts by potential intruders to exploit the buffer overflow-related weakness within a computing environment.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

DETAILED DESCRIPTION OF THE PREFERRED EMBODIMENTS

The Buffer Overflow event is a common weakness of computer software systems related to the fact that software developers around the world, utilizing prevalent state-of-art programming languages such as "C", have the responsibility of handling memory allocations themselves in order to accomplish tasks involving specific functionalities of certain important applications. The developers may make accidental mistakes when allocating memory thereby introducing severe programming errors into the computing environment and even effect catastrophic operating system failures. Furthermore, intentional exploitation of the buffer overflow weakness enables sophisticated intruders to gain access to a computing environment by passing invalid parameters to a faulty program, and consequently make the computer execute the code passed as a parameter by the intruder. The attacking code could readily contain malicious instructions that could produce serious mysfunctions in the computer system thus penetrated.

The present invention offers a method to detect and prevent buffer overflow events in real time. The method is implemented by using the System Call and the API Interception System model and thereby attaching a segment of custom-written code to each system call and library call to investigate the original memory address of the call. Thus, the present invention overcomes the disadvantages of the prior art by providing a novel method, which detects whether an attempt to exploit the buffer overflow weakness is in progress by determining whether the system or library call is coming in from a valid address space of the calling process. If the call has arrived from an invalid address space, a safe deduction could be made in respect to an ongoing attempt of a buffer overflow attack.

Figure 1:
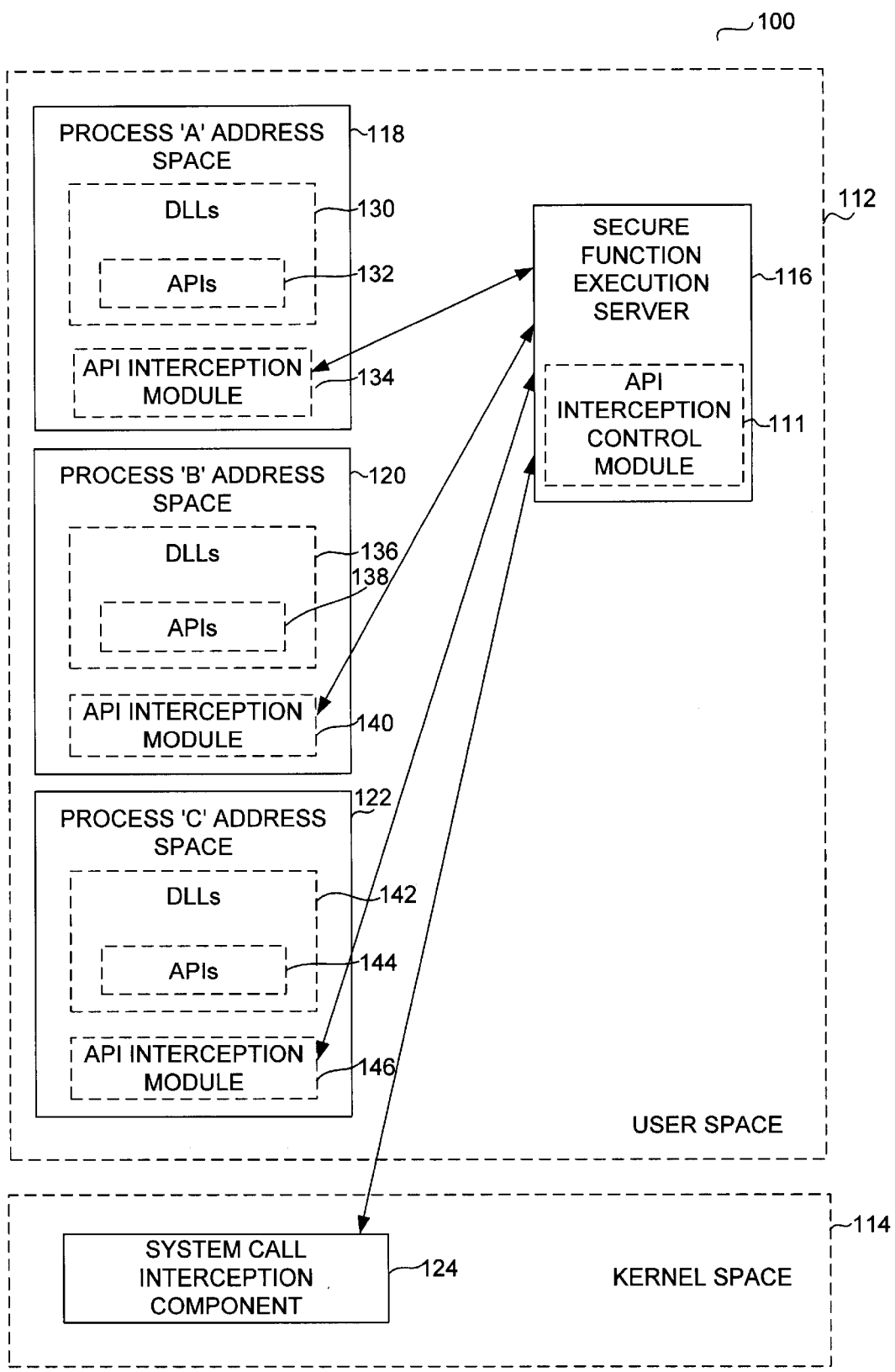
FIG. 1 is a block diagram of the Secure Function Execution System environment generally referenced to as system 100.

FIG. 1 is a schematic illustration of the system environment wherein the Secure Function Execution System is operating, generally referred to as system 100, in accordance with a preferred embodiment of the present invention. Secure Function Execution system 100 of FIG. 1 is designed to identify and prevent buffer overflow attacks in real time. Secure Function Execution System 100 comprises four principal components:

One) Secure Function Execution Server 116 is an active component. Secure Function Execution Server 116 is the operational center of the Secure Function Execution System 100. Secure Function Execution Server 116 incorporates the API Interception Control Module 111, which is the operational center of the API Interception System model. Secure Function Execution Server 116 loads and controls System call Interception Component 124, loads and controls API Interception Modules 134, 140, and 146 that are elements of the API Interception System model, and which through API Interception Control Module 111, responds to various system and library calls and operates as an interface towards the user. The Secure Function Execution Server 116 is loaded into the user space memory device 112 of a computer system.

Two) API Interception Modules 134, 140, and 146 that are elements of the API Interception System model are active components. API Interception Modules 134, 140, and 146 are Dynamic Link Library (DLL) modules, which are loaded by API Interception Control Module 111 into each active process address space 118, 120, and 122 mapped into user space memory device 112. API Interception Modules 134, 140, and 146 inside active process address spaces 118, 120, and 122 are linked with API Interception Control Module 111 in Secure Execution Server 116. The link is established directly by API Interception Modules 134, 140, and 146 after said API Interception Modules have been loaded into active address spaces 118, 120, and 122. It will be appreciated by those skilled in the art that the number of API Interception Module copies present within active processes residing within the computer system address space is associated with the number of processes active at any given time. API Interception Modules consist of a Dispatch Routine, a Hook and Patch Routine, a Pre-Entry Routine, and a Post-Entry Routine. The routines are elements of the API Interception System model. The description of the functionalities and operations of the routines are set forth hereunder.

Three) System Call Interception Component 124 is an active component. System Call Interception Component 124 operates in the kernel space memory device 114 and is linked to Secure Execution Control Server 116 present within user space memory device 112.

Four) API routine 132, 138, and 144 are passive components. API routines 132, 138, and 144 are potential objects upon which Secure Function Execution System 100 might operate. API routines 132, 138, and 144 are loaded into process address space memory device 118, 120, and 122 mapped into user memory device 112 of system 100.

The subject of the present invention is the secure Function Execution Server 116. Secure Function Execution Server 116 is utilizing the mechanism of the APT Interception System model to accomplish the present invention's objectives. For the clarity of the disclosure, the reasons for utilizing the API Interception System model will be described next.

As the maximum length of the overflowing string can only be as long as the current depth of the stack buffer, overflow attack codes should be short in terms of code length. Any attempts to write into the memory device outside the stack limits will result in a raising of an exception condition that will defeat the objectives of the attack code. Therefore, the lack of potentially useful space for the attack forces the intruder to develop attack code in such a manner as to use the highest level API functions. For example, an attacker that will try to create a file on the local File System will not write assembler code to accomplish the task but will call a system-call or a library function (API) that will expand into the suitably long length code. Additionally, the attacker must use library functions (API's), as it is practically impossible to code individually system-call or library-call equivalents. As the API Interception System model intercepts, pre-processes, and post-processes all library function calls and has the capability to prevent the running of the illegal calls, the use thereof is especially suitable for the purpose of buffer overflow attack identification and prevention. Therefore, although the API Interception System model is not the subject of the present invention, in order to provide a thorough understanding of the invention a general description of the API Interception System model will be given next. It will be easily perceived that the preferred location for inspecting the original memory address of a library call is within a routine that is acting as a pre-processor for the called library function. API Interception System model provides such a pre-processor routine which will be described hereunder in association with the API Interception System model. It will be also clear that the best-placed element to prevent the execution of an illegal call is the API Interception Control Module 111.

In the preferred embodiment of the present invention, the API Interception System model provides a means to intercept library calls performed in the computer system. An API Interception Module 134, 140, and 146 is injected by API Interception Control Module 111 into a process address space 118, 120, and 122 each time a new process associated with an address space is created.

A technique called double patching is utilized to handle an intercepted API function. The method of double patching makes available the option of modifying the API function's flow of logic thereby enabling the execution of user-developed object code segments in association with the execution of the API function. The objectives of the double patching method are: (1) To enable the execution of a user-developed routine before the execution the API function, (2) to enable consequently the execution of the entire API function, (3) to implement the method seamlessly and transparently in a multi-processing environment, (4) to accomplish the above objectives in regard to all native-code API functions, (5) to accomplish the above objectives without the necessity of modifying the source code of the API function, therefore without the need to re-compile the API function.

The detailed operation of the double patching method and the computational logic necessary in order to achieve these objectives are specifically described in the related patent application, Attorney Docket No. 253/068, U.S. Ser. No. 09/651,395 filed on Apr. 28, 2000.

It would be easily perceived that the method of double patching is not limited to API functions. Any operative routine in the computing environment could be handled by said method.

After being loaded API Interception Module 134, 140, and 146 Hook and Patch routine, by means of the above mentioned double patching method, proceeds to hook all API routines 132, 138, and 144 and to patch the object code of all API routines 132, 138, and 144 present in the process address space 118, 120, and 122. When a patched API routine is called the patch acts as a redirection instruction. Subsequently the flow of execution of the patched API routine 132, 138, and 144 is redirected into the Dispatch routine that is part of the API Interception Module. The Dispatch routine in association with the Pre-entry and the Post-entry routines functions as a pre-processor and a post-processor to the API. For example, tests could be made to determine whether the calling program has the suitable privileges to execute the API, whether the arguments passed by the calling program are legal or valid and the like. Various actions associated with the tests results could be performed such as stopping the execution of the API or filtering the arguments passed to the API and the values returned from the API. When the API satisfies the predefined conditions for a standard execution, the object code is re-patched and the flow of execution is redirected into the API.

The tests performed by the Secure Function Execution System 100 are performed in association with the Pre-entry routine of the API Interception Module 134, 140, and 146 each time an API is called. Therefore, the investigation regarding the calling memory address of the API function in order to identify and prevent buffer overflow attacks will be preferably included in an custom-coded extension of the Pre-entry routine of the API Interception Modules 134, 140, and 146.

It would be easily perceived that the API Interception System and the present invention are not limited to the handling of System DLLs but are applicable to all DLLs that include exported functions.

It will be appreciated by those skilled in the art that the present invention may operate under various similar systems, and that the system shown herein is an example to further illustrate the working of the present invention.

Figure 2:
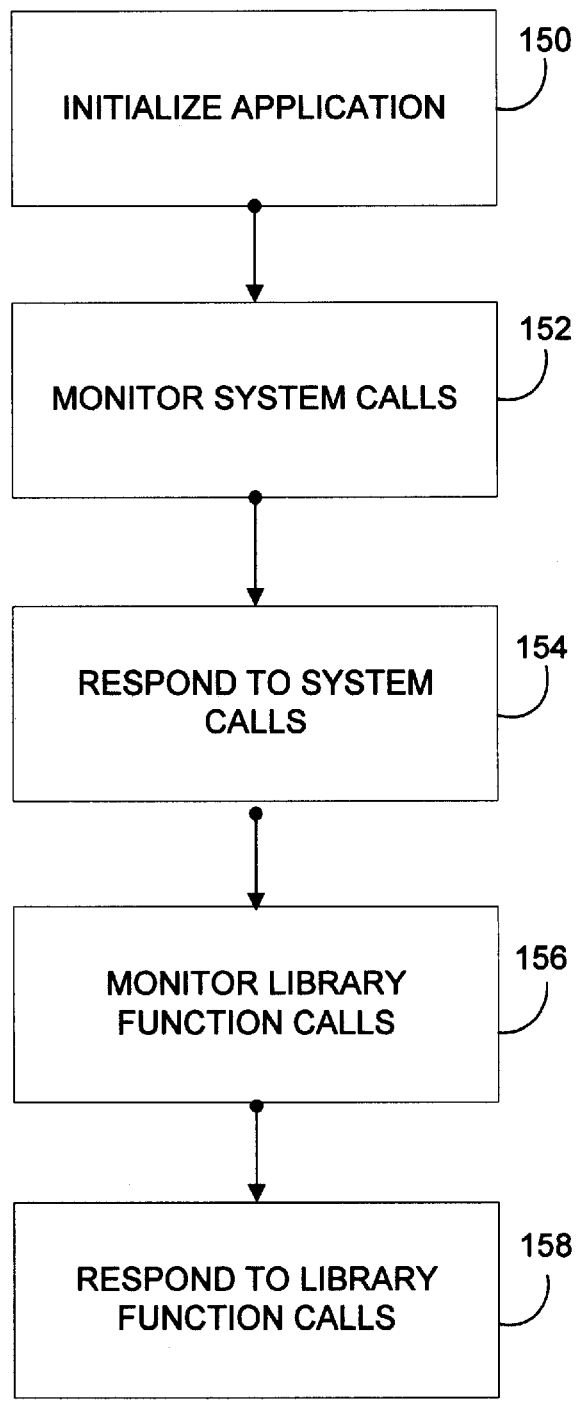
FIG. 2 is a high-level flow diagram of the Secure Function Execution Server 116 operation.

Referring to FIG. 2 there is provided a high-level flow diagram of the Secure Function Execution Server 116 operation. The operation of said Secure Function Execution Server 116 is now briefly explained.

Secure Function Execution (hereinafter referred to as SFE) Server 116 initializes the application in step 150. Consequently SFE Server 116 commences its run-time operation in step 152 by constantly monitoring system calls made by diverse applications that run in the host operating system and responding appropriately to the system calls (step 154) as described in detail in FIG. 4. SFE Server is also constantly monitoring library calls made by diverse application that run in the host operating system (step 156). SFE Server responds appropriately to the library calls (step 158) as described in detail in FIG. 5.

For reasons related to performance values of the system such as the speed of operations, the amount of system calls and function calls to be monitored should be preferably minimized. By analyzing the methods and the objectives of the potential buffer overflow attacker a deduction could be made regarding significant reduction of the number of calls that preferably should be monitored. The intruder could try two types of attacks. (A) Local attacks in which the attacker will attempt to open a software object such as a file the access to which requires special privileges that the attacker does not possess. As a result, the operating system will prevent the access. Consequently, the attacker will attempt to change the privilege database of the operating system in order to get the special privileges. (B) Remote attacks in which the attacker will attempt to execute some code on a remote machine in order to create a local file or to try and open a remote shell. There are some special system calls and system APIs that serve as general use functions and therefore will be called in order to accomplish almost every task. The critical system APIs are operating-system-specific. For example, under the Windows NT operating system at least the following functions should be preferably intercepted:

1) Kernel32.dll—GetProcAddress(..);
2) Kernel32.dll—LoadLibraryA(..);
3) Kernel32.dll—LoadLibraryB(..);
4) Kernel32.dll—LoadLibraryExA(..);
5) Kernel32.dll—LoadLibraryExW(..).

Figure 3:
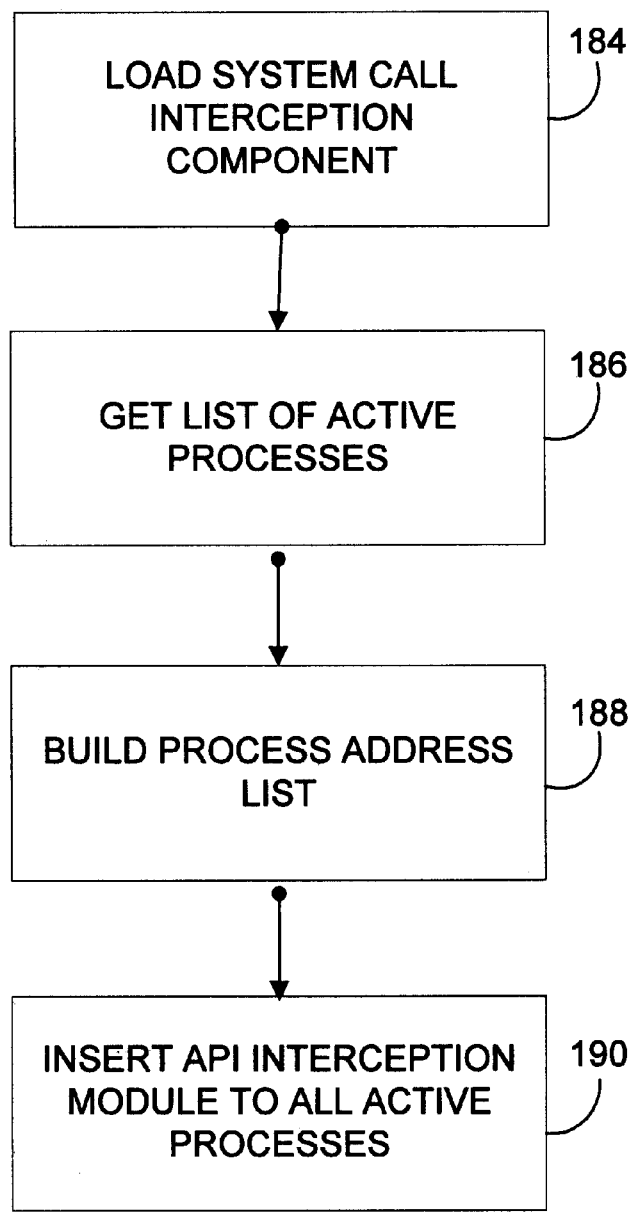
FIG. 3 is a high-level flow diagram of the operation of the Secure Function Execution Server initialization module referred to in FIG. 2.

FIG. 3 illustrates a high-level flow diagram of SFE Server 116 start-up operation referenced as step 150 of FIG. 2. First SFE Server 116 loads System Call Interception Component 124 into kernel space memory device 114 (step 184). After establishing communication with System Call Interception Component 124 SFE Server 116 queries System Call Interception Component 124 for the list of active processes 118, 120, and 122 (step 186). Using the said list of active processes 118, 120, and 122 SFE Server 116 creates a list of valid address ranges for each active process 118, 120, and 122. Hereinafter this structure will be referred to as Process Valid Address Range List.

A valid address range is defined as a memory execution area into which the original file that builds the process was mapped. Additionally, a process valid address range includes all other virtual address spaces that the process supplementary elements are mapped into, such as shared libraries (DLLs).

Consequently, Process Valid Address Range List holds the address range into which the process 118, 120, and 122 were mapped. Process Valid Address Range List also holds all the virtual address ranges into which diverse Dynamic Link Library (DLLS) 130, 136, and 142, were mapped. A Dynamic Link Library is a set of callable subroutines linked as a binary image that can be dynamically loaded by applications that utilize them. Finally, SFE Server 116 instructs API Interception Control Module 111 to insert API Interception Modules 134, 140, and 146 to all active processes 118, 120, and 122 (step 190).

Figure 4:
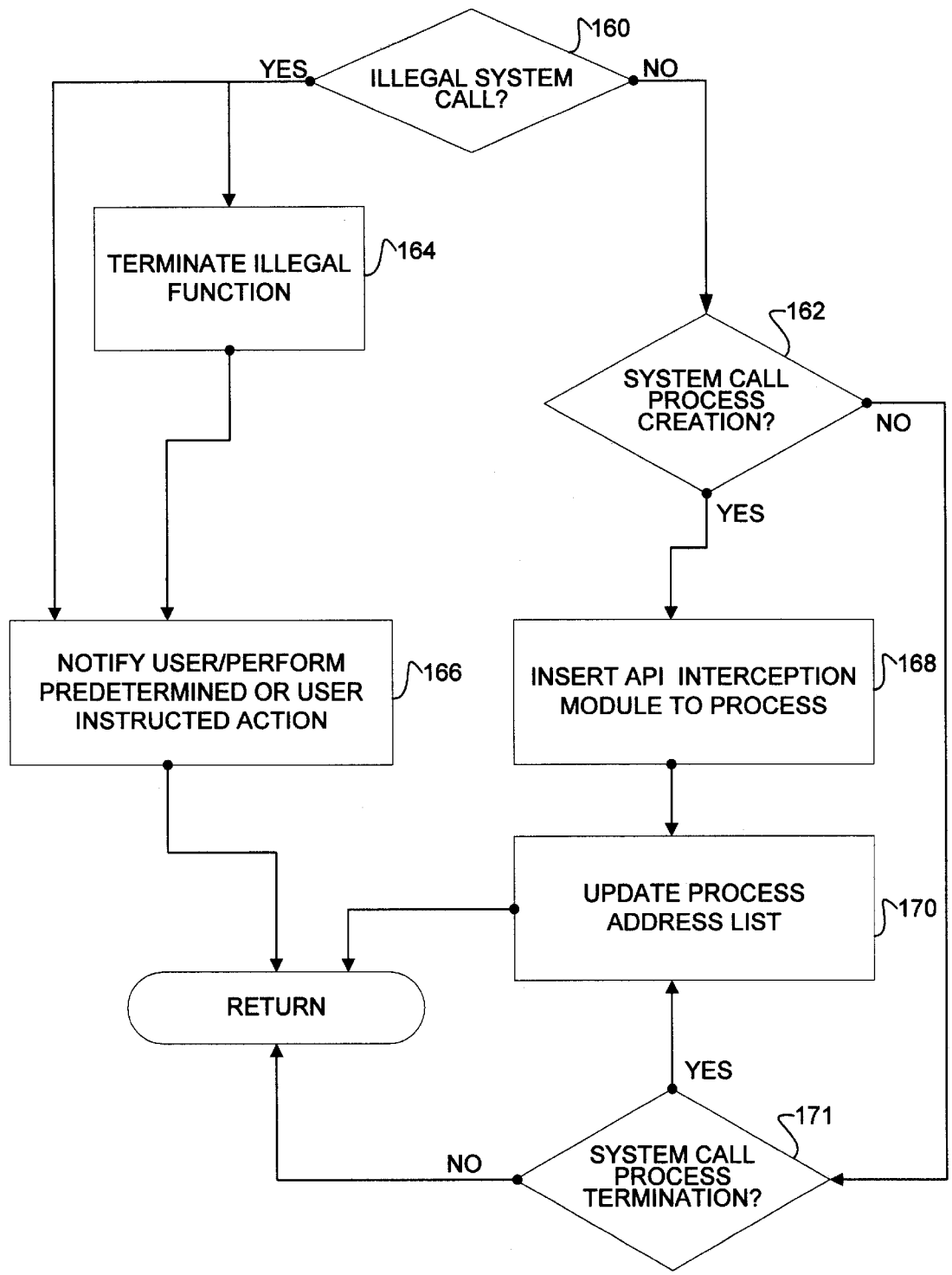
FIG. 4 is a high-level diagram of Secure Function Execution Server or the like response to an intercepted system call referred to in FIG. 2.

Turning now to FIG. 4 which is a high-level flow diagram of SFE Server 116 response to an intercepted system call, referred to as step 154 of FIG. 2. SFE Server 116 determines in step 160 whether the system call detected is an illegal call or a legal call. SFE Server 116 determines whether said system call is valid by comparing said system call originating memory address with the range of Process Valid Address Range List associated with said process from which said system call originated. If an illegal call was detected the SFE Server 116 may terminate the illegal function (step 164). Alternatively SFE Server 116 may notify a user (typically the System Administrator) about the illegal call (step 166). Alternatively, SFE Server 116 may perform another or other series of user predetermined actions (step 166).

If the system call detected is legal (step 160) SFE Server 116 examines the said system call to determine whether the type thereof is process creation (step 162). If and when determined that the system call is of the type of process creation, SFE Server 116 instructs API Interception Control Module 111 to insert API Interception Module 134 to the newly created process address space 118 (step 168) and updates Process Valid Address Range List (step 170) by adding said process address list to Process Valid Address Range List. If and when it is determined that the system call is of the type of process termination (step 171), SPE Server 116 updates Process Valid Address Range List (step 170) by removing said process valid addresses range from Process Valid Address Range List. Control then returns to SFE Server 116 monitoring library calls in step 156 of FIG. 2.

Figure 5:
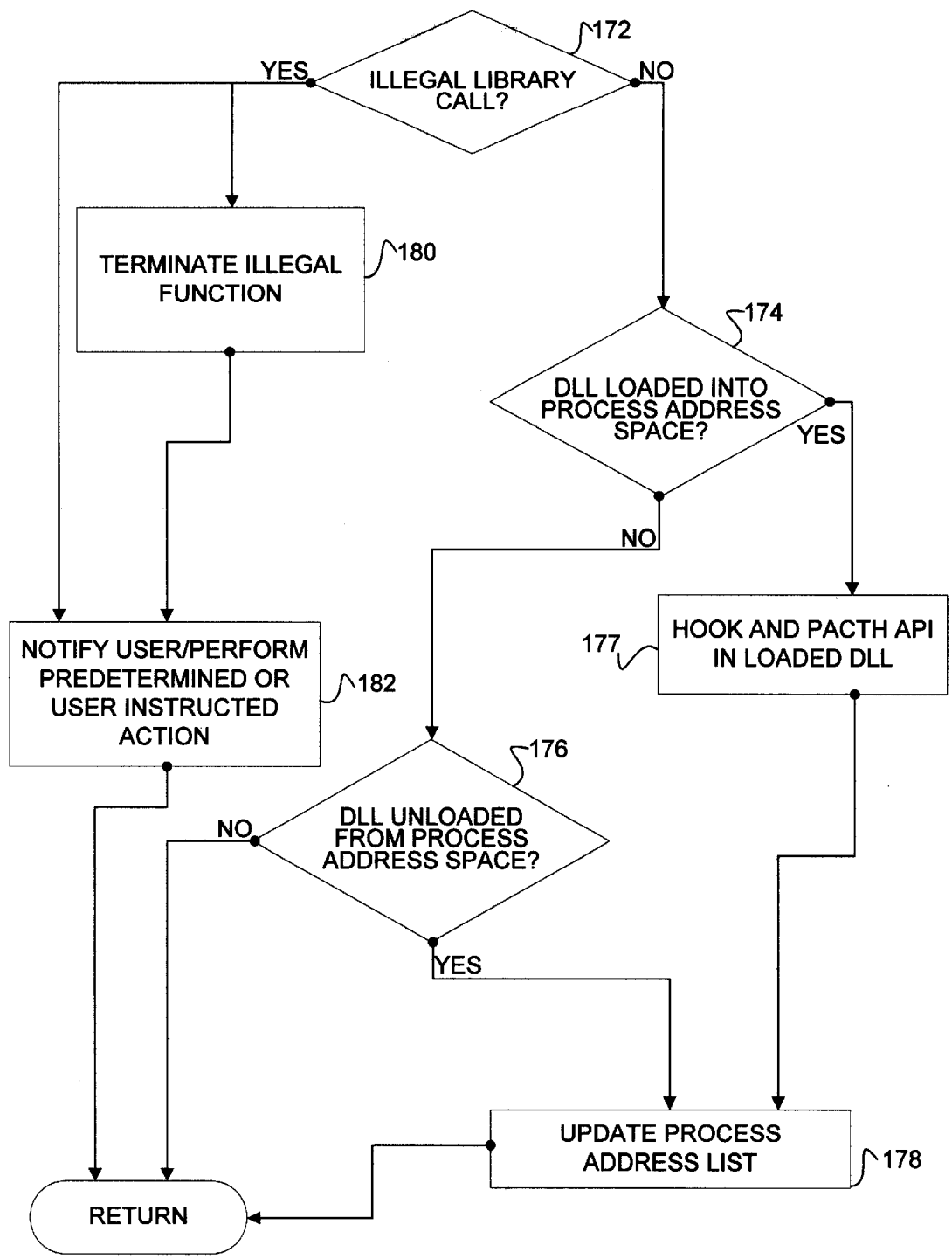
FIG. 5 a high-level flow diagram of the operation of the Secure Function Execution Server and the like library call response module referred to in FIG. 2.

FIG. 5 illustrates a high-level flow diagram of the SFE Server response to an intercepted library call referred to as step 158 of FIG. 2. SFE Server 116 determines in step 172 whether the library call detected is an illegal call. SFE Server determines whether the library call is valid by comparing the library call originating memory address with the range of Process Valid Address List associated with the process from which the library call originated. If an illegal call is detected SFE Server 116 optionally terminates the illegal library function (step 180). Alternatively, SFE Server 116 notifies a user (typically the System Administrator) (step 182). Alternatively, SFE Server 116 performs any other user predetermined or instructed action (step 182).

If the library call detected is legal (step 172), SFE Server 116 determines if the library call is of the type of DLL 130 load (step 174). If the decision in step 174 is affirmative, then SFE Server 116 instructs API Interception Module 134 through API Interception control Module 111 to hook and patch the library functions (APIS) 132 existing within the loaded DLL 130 (step 177). After hooking and patching, the API Interception Module 134 already loaded into the associated process 118 is now operative to intercept calls made to the library calls 132. When determined that the library call is of the type DLL load, SFE Server 116 updates Process Valid Address Range List (step 178) by adding the DLL address range into process Valid Address Range List. If the decision in step 174 is negative, SFE Server 116 determines if the intercepted library call is of the type DLL unload (step 176). When it is determined that the library call is of the type of DLL unload SFE Server updates the Process Valid Address Range List by deleting DLL address range from Process Valid Address Range List (step 178).

Figure 6:
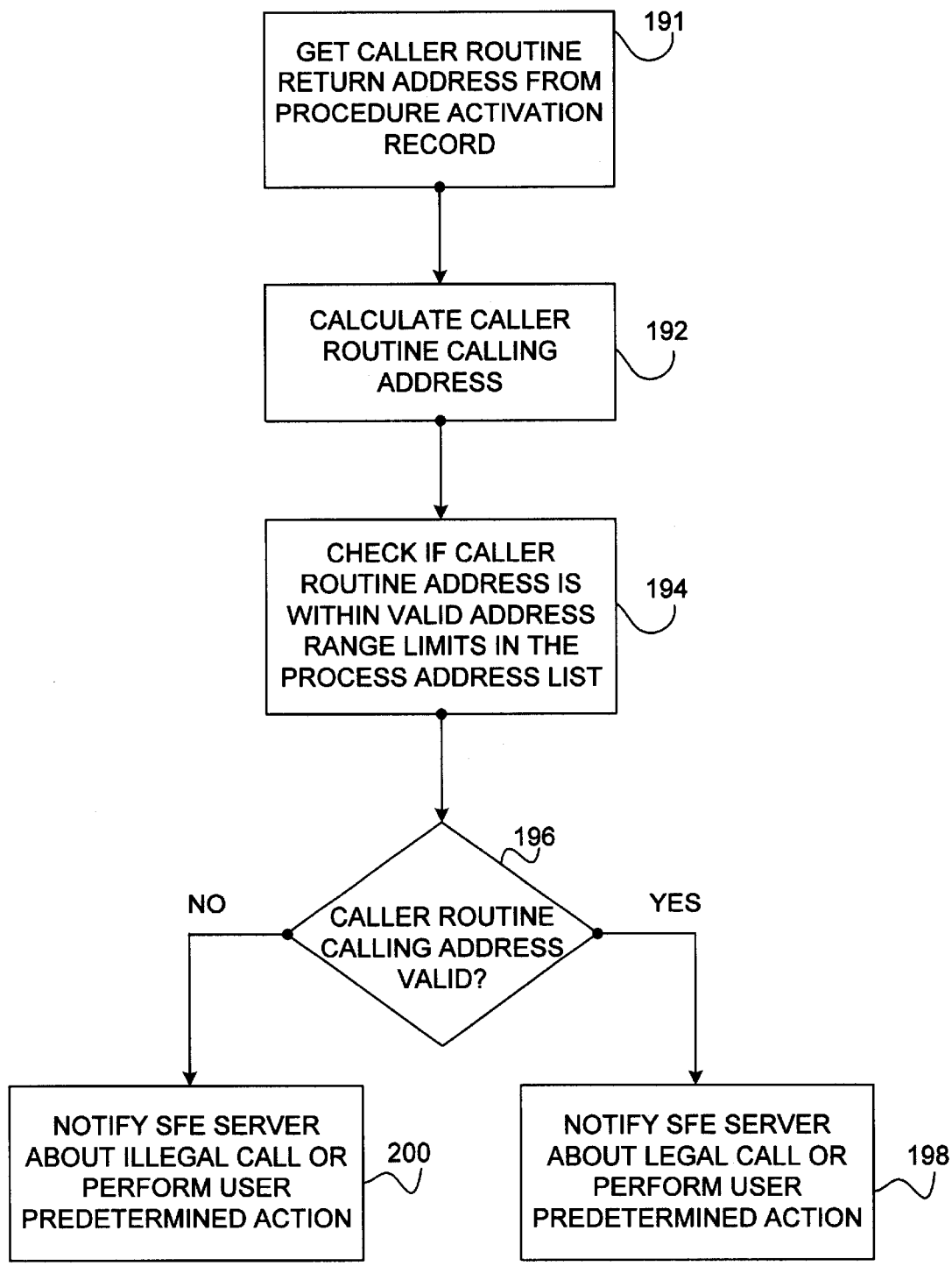
FIG. 6 is a high-level flow diagram of the operation of the Calling Address Validation Routine module.

FIG. 6 illustrates a high-level flow diagram of the operation of the Calling Address Validation Routine module. The Calling Address Validation Routine module operates in conjunction with API Interception Module Pre-Entry routine.

Pre-Entry routine may be activated when an API 132 or the like of FIG. 1 is intercepted. Operating under SFE System 100 Pre-Entry routine, Calling Address Validation Routine module is executing a set of instructions designed to validate the API function 132 of FIG. 1 calling address (caller Routine). Caller Routine also includes caller Application Program Interface, caller system call, caller library call and the like.

Calling Address validation Routine module commences its operation by reading the caller Routine return address from the Procedure Activation Record (stack frame) which is on the user stack segment (step 191). The stack frame is a dynamic area of the process stack segment used as a control area for function calls. The process stack segment is a dynamic area of memory belonging to a process. In step 192 the caller Routine calling address is calculated, and with the help of the data in Process Valid Address Range List, it is examined if the caller Routine calling address is within valid address range limits (step 194). In step 196 it is determined whether the calling address is valid or non-valid.

To calculate whether the caller Routine calling address is within the valid address range limit the caller Routine calling address is matched with the valid address range limit. If the caller Routine calling address is within the valid address range, then the caller Routine calling address is valid. Next, Calling Address validation Routine module, by Pre-Entry routine or the like, notifies SPE Server 116 or the like about the test result (step 198 and step 200).

It will be appreciated by persons skilled in the art that in this illustrated embodiment of the present invention any unauthorized or illegal system call or library call originating form memory areas out of active process address space memory device 118, 120, and 122 of FIG. 1 will be detected, and optionally their execution will be prevented by SFE System 100.

For reasons related to the performance values of the system it would be advantageous to reduce the number of comparison operations executed by the pre-processor routine. Such a reduction could be accomplished readily as the known type of buffer overflow attacks typically exploits the stack buffer overflow weakness. Thus, it would be advantageous to determine in one compare operation whether the call is coming in from an invalid execution area such as the stack.

Figure 7:
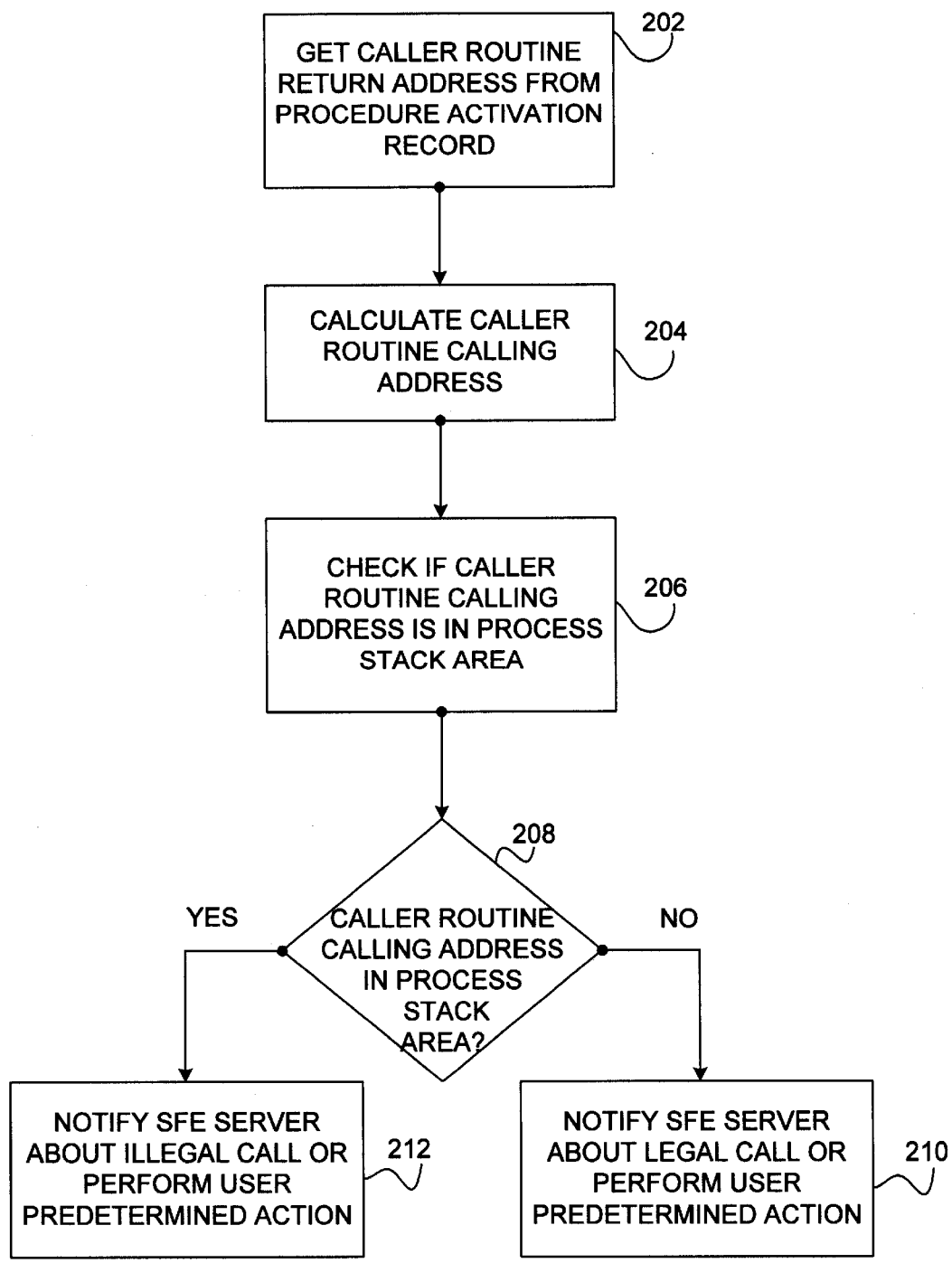
FIG. 7 is a high-level flow diagram of the Calling Address Validation Routine module relating to an another embodiment of the present invention.

Accordingly, reference is now made to FIG. 7, which is a high-level flow diagram of the Calling Address Validation Routine module relating to an another embodiment of the present invention.

In the embodiment thereof, Calling Address Validation Routine module commences its operation by reading the caller return address from the Procedure Activation Record (stack frame) on the process stack segment (step 202). It will be appreciated that reading caller Routine return address is significantly faster and more accurate. In step 204 the caller Routine calling address is calculated, and it is examined with the help of system-level structures to determine whether the calling address is inside the address limits of the process stack segment (step 206). Such determination is accomplished by comparing the caller Routine calling address with address limits of said process stack segment. Next, Calling Address Validation Routine module by Pre-Entry routine or the like notifies SFE Server 116 or the like about the result of the examination (step 210 and step 212).

It will be appreciated by persons skilled in the art that in this further embodiment of the invention any unauthorized or illegal system call or library call originating from the process stack segment structure will be detected and optionally prevented by SFE System 100.

Additional advantages will readily occur to the person skilled in the art. The invention, in its broader aspects is, therefore, not limited to the specific details, representative methods, systems and examples shown and described. It will be further appreciated by persons skilled in the art that the present invention is not limited to what has been particularly shown and described hereinabove but rather by the claims which follow.

We claim:

1. In a computer system running an operating system platform, said operating system including a kernel space and a process space, said process space including a user application running in process space, said user application operative to intercept system calls, a method of secure function execution, said method comprising the step of:

examine said intercepted system call validity by comparing said intercepted system call originating address with range of process valid addresses associated with said process from which said intercepted system call originated.

2. The method of claim 1, further comprising the step of:

providing notification as to the validity of said intercepted system call.

3. The method of claim 1, further comprising the step of:

terminating said intercepted system call.

4. The method of claim 2, further comprising the step of:

terminating said intercepted system call.

5. The method of claim 1, further comprising the steps of:

responsive to process creation inserting application program interface interception module into said created process; and responsive to process creation updating process valid addresses table.

6. The method of claim 1, further comprising the step of:

responsive to process termination updating process valid addresses table.

7. In a computer system running an operating system platform, said operating system including a kernel space and a process space, said process space including a user application running in process space, said user application operative to intercept library calls, a method of secure function execution, said method comprising the step of:

examine said intercepted library call validity by comparing said intercepted library call originating address with range of process valid addresses associated with said process from which said intercepted library call originated.

8. The method of claim 7, further comprising the step of:

providing notification as to the validity of said intercepted library call.

9. The method of claim 7, further comprising the step of:

terminating said intercepted library call.

10. The method of claim 8, further comprising the step of:

terminating said intercepted library call.

11. The method of claim 7, further comprising the steps of:

responsive to system call loading dynamic link library hooking and patching library routines associated with said dynamic link library; and responsive to system call unloading dynamic link library updating process valid addresses table.

12. In a computer system running an operating system platform, said operating system including a kernel space and a process space, said process space including a user application running in process space, said user application operative to system and function calls, said system or function call intercepted, a method of secure function execution, said method comprising the steps of:

receiving caller routine return address from said process memory device; and determining whether caller routine address is valid by comparing said caller address routine with process valid address table.

13. The method of claim 12, further comprising the step of:

providing notification as to the validity of said caller routine return address.

14. The method of claim 12, further comprising the step of:

performing user predetermined acts associated with said validity of caller routine address.

15. The method of claim 12, wherein the step of receiving caller routine return address from said process memory device further comprises the step of:

determining said caller routine calling address by determining the address preceding said caller routine address.

16. In a computer system running an operating system platform, said operating system including a kernel space and a process space, said process space including a user application running in process space, said user application operative to system and function calls, said system or function call intercepted, a method of secure function execution, said method comprising the steps of:

receiving caller routine return address from said process memory device; and determining whether caller routine address is valid by comparing said caller address routine with associated process stack address area.

17. The method of claim 16, further comprising the step of:

providing notification as to the validity of said caller routine return address.

18. The method of claim 16, further comprising the step of:

performing user predetermined acts associated with said validity of caller routine address.

19. The method of claim 16, wherein the step of receiving caller routine return address from said process memory device further comprises the step of:

determining said caller routine calling address by determining the address preceding said caller routine address.

* * * * *